United States Patent
Scofield

(10) Patent No.: US 11,738,768 B2
(45) Date of Patent: *Aug. 29, 2023

(54) MANUAL VEHICLE CONTROL NOTIFICATION

(71) Applicant: INRIX, Inc., Kirkland, WA (US)

(72) Inventor: Christopher L. Scofield, Seattle, WA (US)

(73) Assignee: INRIX, INC., Kirkland, WA (US)

( * ) Notice: Subject to any disclaimer, the term of this patent is extended or adjusted under 35 U.S.C. 154(b) by 56 days.

This patent is subject to a terminal disclaimer.

(21) Appl. No.: 17/341,538

(22) Filed: Jun. 8, 2021

(65) Prior Publication Data

US 2021/0291873 A1 Sep. 23, 2021

Related U.S. Application Data

(63) Continuation of application No. 14/845,356, filed on Sep. 4, 2015, now Pat. No. 11,040,725.

(51) Int. Cl.
*B60W 50/14* (2020.01)
*B60K 28/00* (2006.01)
(Continued)

(52) U.S. Cl.
CPC ............ *B60W 50/14* (2013.01); *B60K 28/00* (2013.01); *B60W 60/0053* (2020.02);
(Continued)

(58) Field of Classification Search
None
See application file for complete search history.

(56) References Cited

U.S. PATENT DOCUMENTS 8,718,861 B1 5/2014 Montemerlo et al.
9,690,292 B1 6/2017 Chan et al.
(Continued)

FOREIGN PATENT DOCUMENTS

DE 102011015130 A1 12/2011
DE 102014201965 A1 8/2014
(Continued)

OTHER PUBLICATIONS

Corresponding Great Britain Patent Application No. GB1802953.8, Examination Report dated Jan. 21, 2021.
(Continued)

*Primary Examiner* — Donald J Wallace
(74) *Attorney, Agent, or Firm* — Cooper Legal Group, LLC

(57) ABSTRACT

One or more techniques and/or systems are provided for notifying drivers to assume manual vehicle control of vehicles. For example, sensor data is acquired from on-board vehicles sensors (e.g., radar, sonar, and/or camera imagery of a crosswalk) of a vehicle that is in an autonomous driving mode. In an example, the sensor data is augmented with driving condition data aggregated from vehicle sensor data of other vehicles (e.g., a cloud service collects and aggregates vehicle sensor data from vehicles within the crosswalk to identify and provide the driving condition data to the vehicle). The sensor data (e.g., augmented sensor data) is evaluated to identify a driving condition of a road segment, such as the crosswalk (e.g., pedestrians protesting within the crosswalk). Responsive to the driving condition exceeding a complexity threshold for autonomous driving decision making functionality, a driver alert to assume manual vehicle control may be provided to a driver.

20 Claims, 7 Drawing Sheets

(51) Int. Cl.
  *G08G 1/16* (2006.01)
  *G08G 1/0967* (2006.01)
  *G05D 1/00* (2006.01)
  *B60W 60/00* (2020.01)
  *G06V 20/59* (2022.01)
  *B60W 40/08* (2012.01)

(52) U.S. Cl.
  CPC ......... *G05D 1/0061* (2013.01); *G06V 20/597* (2022.01); *G08G 1/096725* (2013.01); *G08G 1/096791* (2013.01); *G08G 1/163* (2013.01); *G08G 1/165* (2013.01); *B60W 2040/0872* (2013.01); *B60W 2050/143* (2013.01); *B60W 2540/22* (2013.01); *B60W 2554/00* (2020.02); *G05D 2201/0213* (2013.01)

(56) References Cited

U.S. PATENT DOCUMENTS

| | | | |
|---|---|---|---|
| 10,241,509 | B1 | 3/2019 | Fields et al. |
| 11,040,725 | B2 * | 6/2021 | Scofield ............ B60W 60/0053 |
| 2003/0050740 | A1 | 3/2003 | Fecher et al. |
| 2012/0235819 | A1 | 9/2012 | Watkins et al. |
| 2014/0156133 | A1 | 4/2014 | Cullinane et al. |
| 2014/0303827 | A1 | 10/2014 | Dolgov et al. |
| 2015/0051781 | A1 | 2/2015 | Schnieders |
| 2015/0066282 | A1 | 3/2015 | Yopp |
| 2015/0175070 | A1 | 6/2015 | Attard et al. |
| 2015/0229885 | A1 | 8/2015 | Offenhaeuser |
| 2015/0241878 | A1 | 8/2015 | Crombez et al. |
| 2016/0026182 | A1 | 1/2016 | Boroditsky et al. |
| 2016/0107655 | A1 | 4/2016 | Desnoyer et al. |
| 2016/0185387 | A1 | 6/2016 | Kuoch |
| 2016/0200317 | A1 | 7/2016 | Danzl et al. |
| 2016/0252903 | A1 | 9/2016 | Prokhorov |
| 2016/0363935 | A1 | 12/2016 | Shuster et al. |
| 2017/0021837 | A1 | 1/2017 | Ebina |
| 2017/0220039 | A1 | 8/2017 | Funakawa |
| 2018/0216958 | A1 | 8/2018 | Park |

FOREIGN PATENT DOCUMENTS

| | | |
|---|---|---|
| DE | 102013006793 A1 | 10/2014 |
| DE | 102013013867 A1 | 3/2015 |

OTHER PUBLICATIONS

Int. Search Report/Written Opinion cited in PCT Application No. PCT/US2016/050118 dated Feb. 13, 2017.
German Patent and Trademark Office; First Non-Final Office Action; dated Nov. 18, 2022; 6 Pages.

\* cited by examiner

MANUAL VEHICLE CONTROL NOTIFICATION

RELATED APPLICATIONS

This application claims priority to and is a continuation of U.S. application Ser. No. 14/845,356, filed on Sep. 4, 2015, now allowed, titled "MANUAL VEHICLE CONTROL NOTIFICATION," which is incorporated herein by reference.

BACKGROUND

Many autonomous driving systems support a spectrum of vehicle autonomy. For example, an autonomous driving system may manage speed, distance to other vehicles by braking or adjusting speed, lane following, turning, etc. In this way, a user may be able to perform other tasks, such as eating, working, engaging in a conversation, resting, etc. Unfortunately, the autonomous driving system may encounter situations that may be too complex (e.g., pedestrians may be entering a crosswalk, leaving the crosswalk, approaching the crosswalk with a bike, stopped within the crosswalk, etc.). Without the ability to provide a driver with an appropriately timed alert to take manual control of the vehicle (e.g., a timely alert so that the user can adequately resume control of the vehicle), the autonomous driving system may implement sub-optimal driving decisions.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for notifying a driver to assume manual vehicle control are provided. In an embodiment of notifying a driver to assume manual vehicle control, a driver alert component may be configured to acquire sensor data from one or more on-board vehicle sensors of a vehicle that is in an autonomous driving mode (e.g., information from a sonar detector, a radar detector, a camera, a stability system, an anti-lock braking system, a thermostat, etc.). In an example, the driver alert component may be integrated into the vehicle or into a computing device associated with the vehicle. In an example, the driver alert component may evaluate the sensor data to determine a driving condition of a road segment that is to be traveled by the vehicle (e.g., a crosswalk, that is 300 meters from the vehicle, may be identified has having 4 pedestrians within the crosswalk, 1 cyclist and a dog approaching the crosswalk, 2 pedestrians entering the crosswalk, etc.). In another example, the driver alert component may transmit the sensor data to a remote computing device, such as a cloud service hosting a driving condition aggregator, for processing (e.g., the driving condition aggregator may evaluate the sensor data and/or vehicle sensor data from other vehicles to create, and transmit back to the driver alert component, driving condition data and/or an instruction as to whether a driver alert should be provided).

Responsive to determining that the driving condition exceeds a complexity threshold for autonomous driving decision making functionality (e.g., more than a threshold number of objects are within or near the crosswalk), a driver alert for the driver to assume manual vehicle control may be generated. The driver alert may be provided to the driver at a point in time, relative to encountering the road segment, based upon the driving condition (e.g., a point in time that affords the driver enough time to assume manual vehicle control for adequate decision making). In an example, the driver alert and/or the point in time may be determined based upon a cognitive load of the driver (e.g., a current activity of the driver, an awareness of the driver, a driving expertise level of the driver, a mental state of the driver, etc.), a state of traffic, and/or potential alternate routes.

In another embodiment of notifying a driver to assume manual vehicle control, a driving condition aggregator may identify a current location of a vehicle that is in an autonomous driving mode. In an example, the driving condition aggregator may be hosted by a server, such as a cloud service having communication connections with various vehicles. The driving condition aggregator may determine a route of the vehicle (e.g., the route may be determined as a predicted route of the vehicle based upon one or more prior trips of the vehicle). The driving condition aggregator may acquire vehicle sensor data from one or more vehicles traveling a road segment, of the route, not yet traveled by the vehicle. The driving condition aggregator may aggregate the vehicle sensor data to determine driving condition data for the road segment (e.g., vehicle cameras, stability systems, braking patterns, and/or other sensor data may indicate black ice on the road segment). The driving condition aggregator may provide an instruction, comprising the driving condition data (e.g., a location and icy condition of the road segment), to the vehicle. The instruction may specify that the vehicle (e.g., a driver alert component) is to determine whether to provide a driver of the vehicle with a driver alert to assume manual vehicle control of the vehicle based upon the driving condition data.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
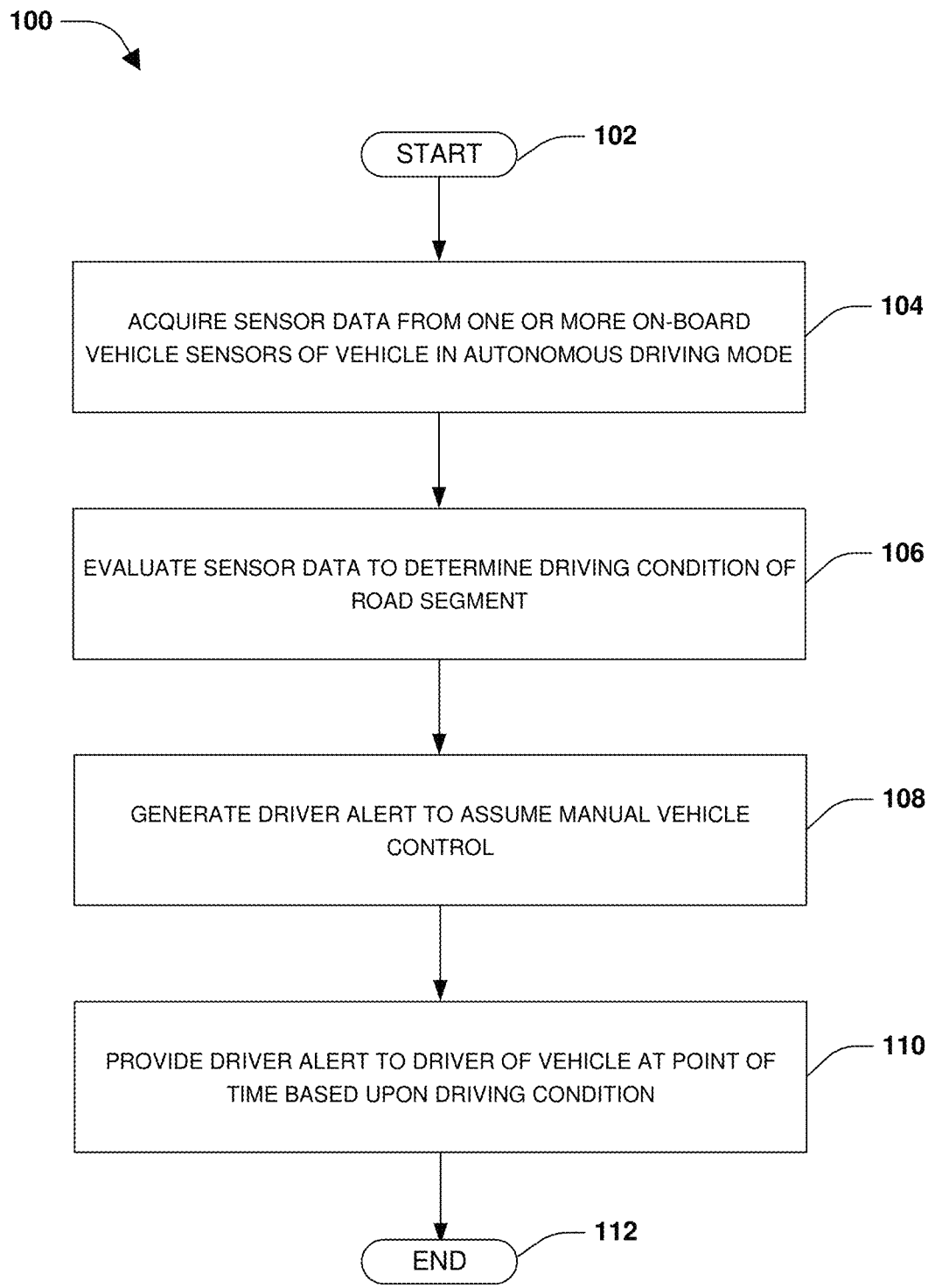
FIG. 1 is a flow diagram illustrating an exemplary method of notifying a driver to assume manual vehicle control.

The claimed subject matter is now described with reference to the drawings, wherein like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. In other instances, structures and devices are illustrated in block diagram form in order to facilitate describing the claimed subject matter.

An embodiment of notifying a driver to assume manual vehicle control is illustrated by an exemplary method 100 of FIG. 1. At 102, the method 100 starts. At 104, sensor data may be acquired from one or more on-board vehicles sensors of a vehicle that is in an autonomous driving mode. For example, radar, sonar, cameras, and/or other sensors of the vehicle may collect information regarding an expressway onramp road segment. In an example where the vehicle may have a communication connection with a remote computing device such as a cloud service hosting a driving condition aggregator, driving condition data for the expressway onramp road segment may be received from the remote computing device over the communication connection. The driving condition data may correspond to an aggregation of vehicle sensor data from one or more vehicles while the one or more vehicles were traveling the expressway onramp road segment (e.g., vehicles may have reported, to the remote computing device, information regarding braking patterns, speed, deceleration, vehicles being driven in reverse, and/or other information indicative of a traffic obstruction on the expressway onramp road segment). In an example, the driving condition data may correspond to weather data, event data (e.g., a news service may indicate a parade on the expressway), vehicle sensor data (e.g., a vehicle changing into a reverse gear), driving impediment data (e.g., a traffic service may indicate that there is blocked traffic on the expressway onramp road segment), and/or data from a service (e.g., social network posts describing the parade). In this way, the sensor data may be augmented with the driving condition data.

In an example, the driving condition aggregator (e.g., hosted by the remote computing device to provide driving condition data and/or instructions to vehicles) and/or a driver alert component (e.g., hosted by the vehicle to provide driver alerts) may utilizing travel prediction functionality to predict a route of the vehicle. For example, the route may be predicted based upon previous trips by the vehicle (e.g., the driver may generally use the expressway to travel to soccer practice on Saturday afternoons). A road segment, such as the expressway onramp road segment, may be identified based upon the route and a current location of the vehicle. In this way, driver alerts may be generated for road segments not yet traveled by vehicles.

At 106, the sensor data (e.g., augmented with the driving condition data if available) may be evaluated to determine a driving condition of the expressway onramp road segment that is to be traveled by the vehicle. The driving condition may correspond to a road condition (e.g., icy, wet, an oil spill, a pot hole, etc.), a weather condition (e.g., freezing rain), a pedestrian (e.g., a biker, people in a crosswalk, a dog in the street, ducks crossing the street, etc.), an accident, an ethical decision (e.g., a car, unable to stop in time, can either swerve out of a pedestrian's way into oncoming traffic or onto a sidewalk with other pedestrians), a driving impediment (e.g., construction, a road barricade, a police car pulling over another car, an ambulance, etc.), etc. For example, the expressway onramp road segment may be determined to have a driving condition corresponding to driving impediment of a group of parade attendees walking up the expressway onramp to enter a parade route along a portion of the expressway.

At 108, responsive to determining that the driving condition exceeds a complexity threshold for autonomous driving decision making functionality, a driver alert to assume manual vehicle control may be generated. For example, the complexity threshold may correspond to a number of pedestrians in a crosswalk, a conditions and/or parameters that autonomous driving decision making functionality is unable to interpret (e.g., an airplane flying towards the vehicle during an emergency landing), conditions and/or parameters that are computationally too expensive to calculate within an adequate time for resolving a driving action before reaching the road segment (e.g., autonomous driving decision making functionality may be unable to timely resolve a driving decision before reaching the expressway onramp), an inability to resolve a driving decision that provides a safe or desirable result (e.g., the ethical decision corresponding to the car, unable to stop in time, that can either swerve out of a pedestrian's way into oncoming traffic or onto a sidewalk with other pedestrians), etc.

At 110, the driver alert may be provided to a driver of the vehicle at a point in time, relative to encountering the road segment, based upon the driving condition. In an example, a determination as to whether to provide the driver alert to the driver may be performed based upon a cognitive load of the driver. For example, the cognitive load of the driver may be determined using sensors (e.g., a camera or microphone may obtain audio visual information indicating that the user is sleeping, eating, conversing with someone, working on a laptop, etc.), evaluating user data (e.g., the user may post to a social network "taking a nap now, I don't feel well", a driver profile may indicate that the user is a student driver, etc.), etc. In this way, the cognitive load may be determined based upon a current activity of the driver, an awareness of the driver, a driving expertise level of the driver, or a mental state of the driver (e.g., the driver may be returning home from a bar, and thus should not be given control of the vehicle, but the vehicle should instead merely pull over until the driving condition has been resolved).

In an example, the point in time may be determined so that the driver has adequate time to switch cognitive states into a manual driving cognitive state and/or so that the driver is not notified too early such that the driver losses attention by the time the road segment is reached. The point in time may be determined based upon the cognition load of the driver, a state of traffic (e.g., a current speed of the vehicle, a time to reach the road segment, a number of vehicles near the vehicle, traffic congestion, etc.), a potential alternate route (e.g., so that the driver has adequate time to decide whether to use the potential alternate route to avoid the road segment), etc. In this way, the driver alert may be provided to the driver.

In an example, a second driving condition, for a second road segment that is to be traveled by the vehicle, may be received from the remote computing device over the communication connection. For example, the second road segment may comprising a city street, 5 miles from the vehicle, leading into a soccer field for Saturday soccer practice for which the driver is predicted to be traveling to as a destination for the route. Vehicles may report erratic braking patterns and/or weaving patterns indicative of surprise road conditions. Such information may be aggregated to determine the second driving condition that is provided to the vehicle. Responsive to determining that the second driving condition exceeds the complexity threshold for autonomous driving decision making functionality, a second driver alert for manual vehicle control may be generated. The second driver alert may be provided to the driver at a second point in time based upon the second driving condition. For example, the second driver alert may be provided 0.25 miles from the city street. At 112, the method 100 ends.

Figure 2:
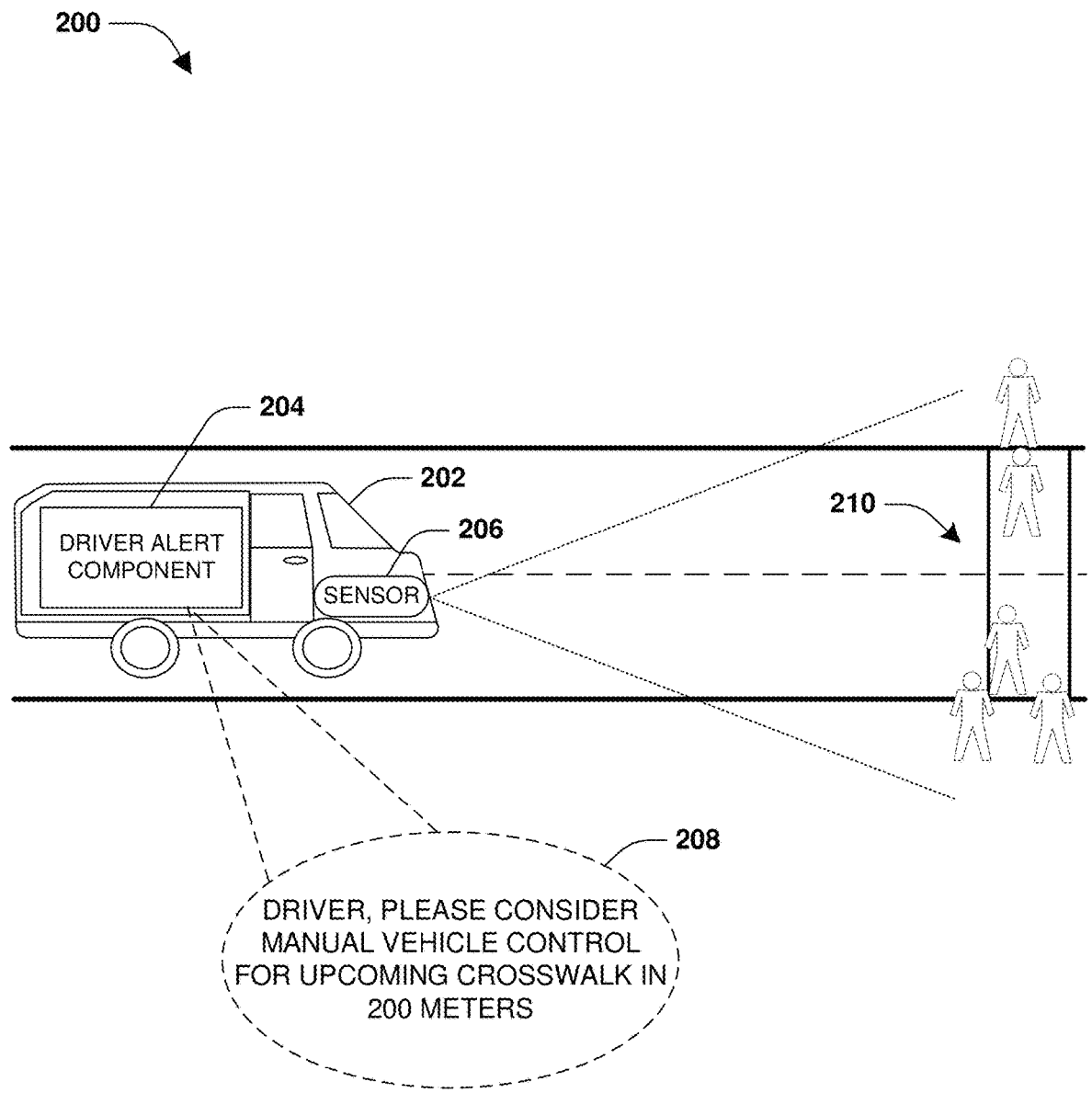
FIG. 2 is a component block diagram illustrating an exemplary system for notifying a driver to assume manual vehicle control, where a driver alert component utilizes sensor data from on-board vehicles sensors for generating a driver alert.

FIG. 2 illustrates an example of a system 200, comprising a driver alert component 204, for notifying a driver of a vehicle 202 to assume manual vehicle control. The driver alert component 204 may acquire sensor data from one or more on-board vehicles sensors of the vehicle 202 that is in an autonomous (e.g., fully autonomous, semi-autonomous, etc.) driving mode. For example, a sensor 206, such as a radar detector, a camera, a sonar detector, etc., may capture sensor data corresponding to a crosswalk 210. The driver alert component 204 may evaluate the sensor data to determine a driving condition of a road segment, such as the crosswalk 210, which is predicted to be traveled by the vehicle 202. For example, the driving condition may indicate that 3 pedestrians are near the crosswalk 210 and 2 pedestrians are within the crosswalk 210.

The driver alert component 204 may evaluate the driving condition against a complexity threshold of autonomous driving decision making functionality (e.g., a predicted calculation time to resolve an adequate autonomous driving action for the driving condition; an unknown constraint or parameter unable to be processed by autonomous driving decision making functionality; an inability to resolve a safe autonomous driving action for the driving condition; an ethical decision, etc.). Responsive to the driving condition exceeding the complexity threshold, the driver alert component 204 may generate a driver alert 208 to assume manual vehicle control of the vehicle 202 (e.g., "driver, please consider manual vehicle control for upcoming crosswalk in 200 meters"). The driver alert 208 may be provided to the driver at a point in time, relative to encountering the road segment, based upon the driving condition.

Figure 3:
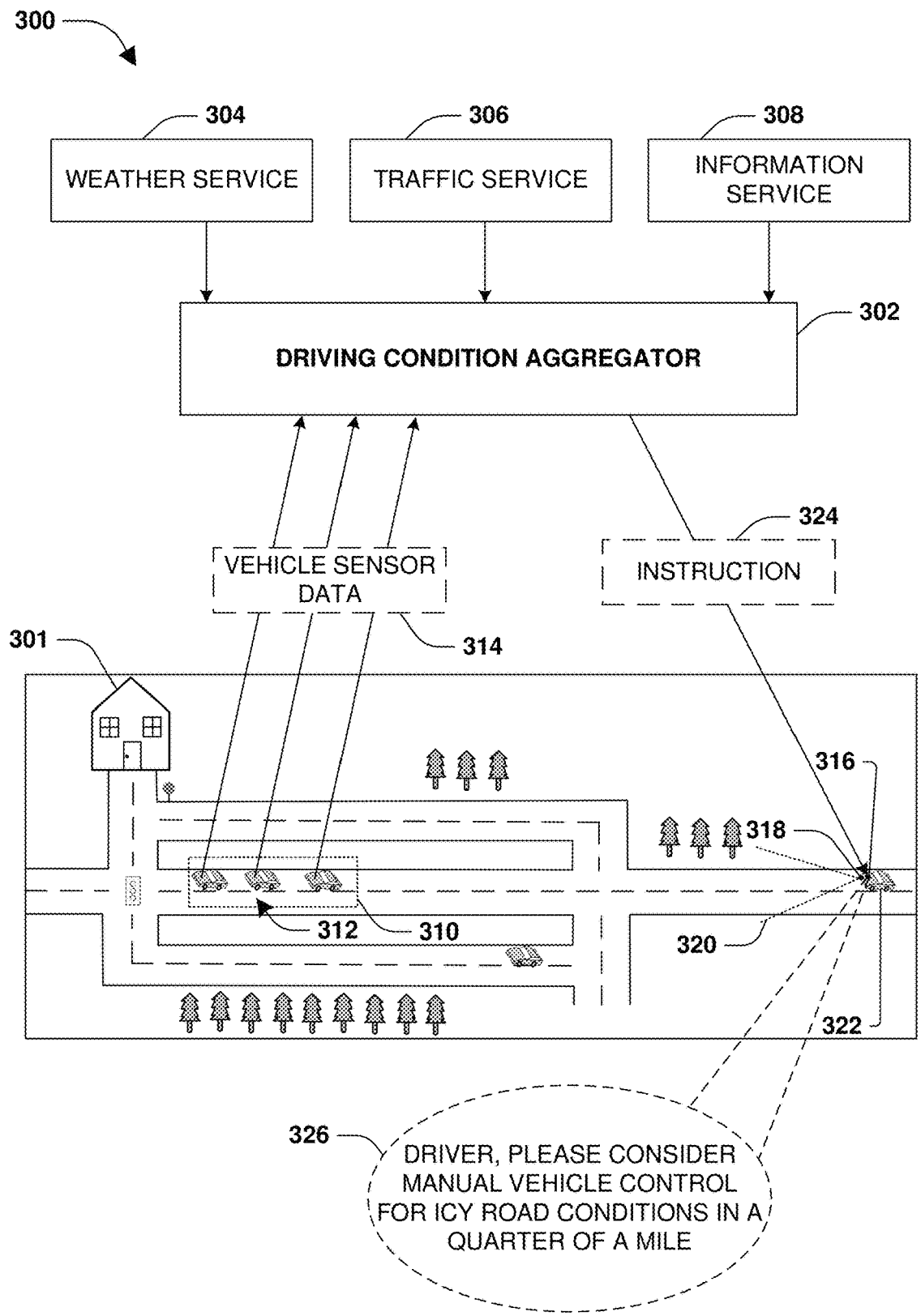
FIG. 3 is a component block diagram illustrating an exemplary system for notifying a driver to assume manual vehicle control, where a driving condition aggregator provides an instruction, comprising driving condition data, to a vehicle.

FIG. 3 illustrates an example of a system 300, comprising a driving condition aggregator 302, for notifying a driver of a vehicle 322 to assume manual vehicle control. In an example, the driving condition aggregator 302 may be hosted on a remote computing device that is remote from the vehicle 322 (e.g., hosted by a cloud server). The driving condition aggregator 302 may identify a current location of the vehicle 322 (e.g., the vehicle 322 may provide global positioning system (GPS) coordinates to the driving condition aggregator 302) that is in an autonomous driving mode. For example, a driver alert component 316 may be utilizing on-board sensors 318 to collect sensor data within a zone 320 near the vehicle 322 for controlling speed, performing lane following, making turns, avoiding driving impediments, and/or for making other autonomous driving decisions.

The driving condition aggregator 302 may determine a route of the vehicle 322. For example, the route may be determined as a predicted route of the vehicle 322 based upon prior trips of the vehicle 322 (e.g., the driver generally drives home 301 at 4:30 on Mondays). The driving condition aggregator 302 may acquire vehicle sensor data 314 from vehicles 312 traveling a road segment 310 of the route. The road segment 310 may correspond to a portion of the route not yet traveled by the vehicle 322. The vehicle sensor data 314 may be aggregated to determine driving condition data for the road segment 310. For example, the driving condition data may indicate black ice on the road segment based upon braking patterns, stability control system activation, imagery, and/or other information provided through the vehicle sensor data 314. In an example, the driving condition aggregator 302 may augment the vehicle sensor data 314 with information from a weather service 304 (e.g., providing below freezing temperature data), a traffic service 306 (e.g., indicating accidents near the road segment 310 from ice), and/or any other information service 308 (e.g., a news service, a website, a social network, etc.). In this way, an instruction 324, comprising the driving condition data, may be provided to the vehicle 322. The instruction 324 may specify that the vehicle 322, such as the driver alert component 318, is to determine whether to provide a driver of the vehicle 322 with a driver alert 326 to assume manual vehicle control of the vehicle 322 based upon the driving condition data (e.g., provide an audible or visual alert "driver, please consider manual vehicle control for icy road conditions in a quarter of a mile").

Figure 4:
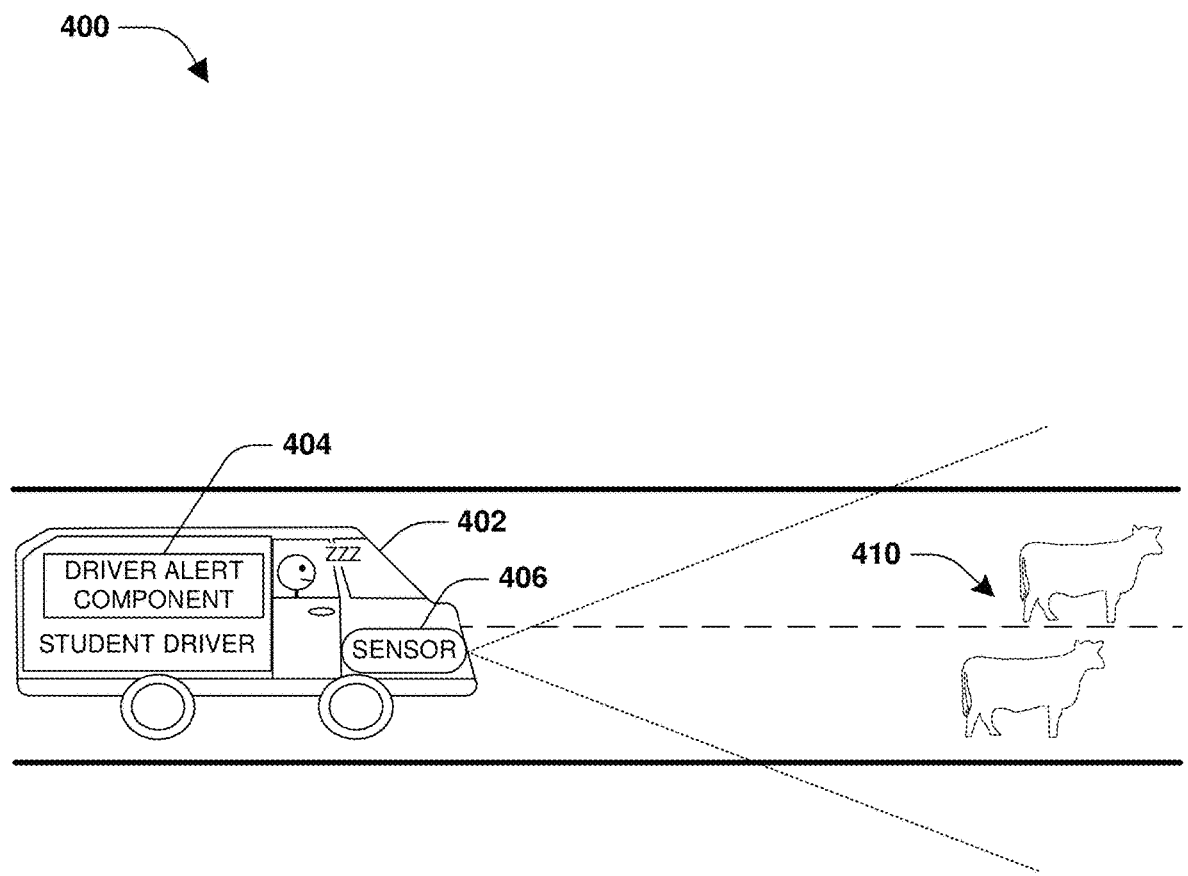
FIG. 4 is a component block diagram illustrating an exemplary system for notifying a driver to assume manual vehicle control, where a cognitive load of a driver is evaluated to determine if and how to provide a driver alert.

FIG. 4 illustrates an example of a system 400, comprising a driver alert component 404, for notifying a driver of a vehicle 402 to assume manual vehicle control. The driver alert component 404 may acquire sensor data from one or more on-board vehicles sensors of the vehicle 402 that is in an autonomous (e.g., fully autonomous, semi-autonomous, etc.) driving mode. For example, a sensor 406, such as a radar detector, a camera, a sonar detector, etc., may capture sensor data corresponding to a zone in front of the vehicle 402. The driver alert component 404 may evaluate the sensor data to determine a driving condition of a road segment, such as the zone, that is to be traveled by the vehicle. For example, the driving condition may indicate that two cows 410 are obstructing the road segment.

The driver alert component 404 may determine that the driving condition exceeds a complexity threshold of autonomous driving decision making functionality because the autonomous driving decision making functionality does not understand how to resolve an appropriate driving action for avoiding the two cows 410. Before generating a driver alert to assume manual vehicle control of the vehicle 402, the driver alert component 404 may evaluate a cognitive load of the driver. For example, a camera may indicate that the driver is sleeping, a social network post by the user "I am taking a nap in my vehicle" may indicate that the driver is sleeping, and a driver profile may indicate that the driver is a student driver. Because the cognitive load may indicate that the driver will be unable to safely assume manual control of the vehicle 402 due to the two cows 410, the driver alert component 404 may pull off the road until the two cows 410 are gone or are capable of being avoided by autonomous driving functionality. In an example, the driver alert component 404 may provide a driver alert to the driver that the vehicle 402 is being pulled over, and that the driver can take control of the vehicle 402 if so desired.

Figure 5:
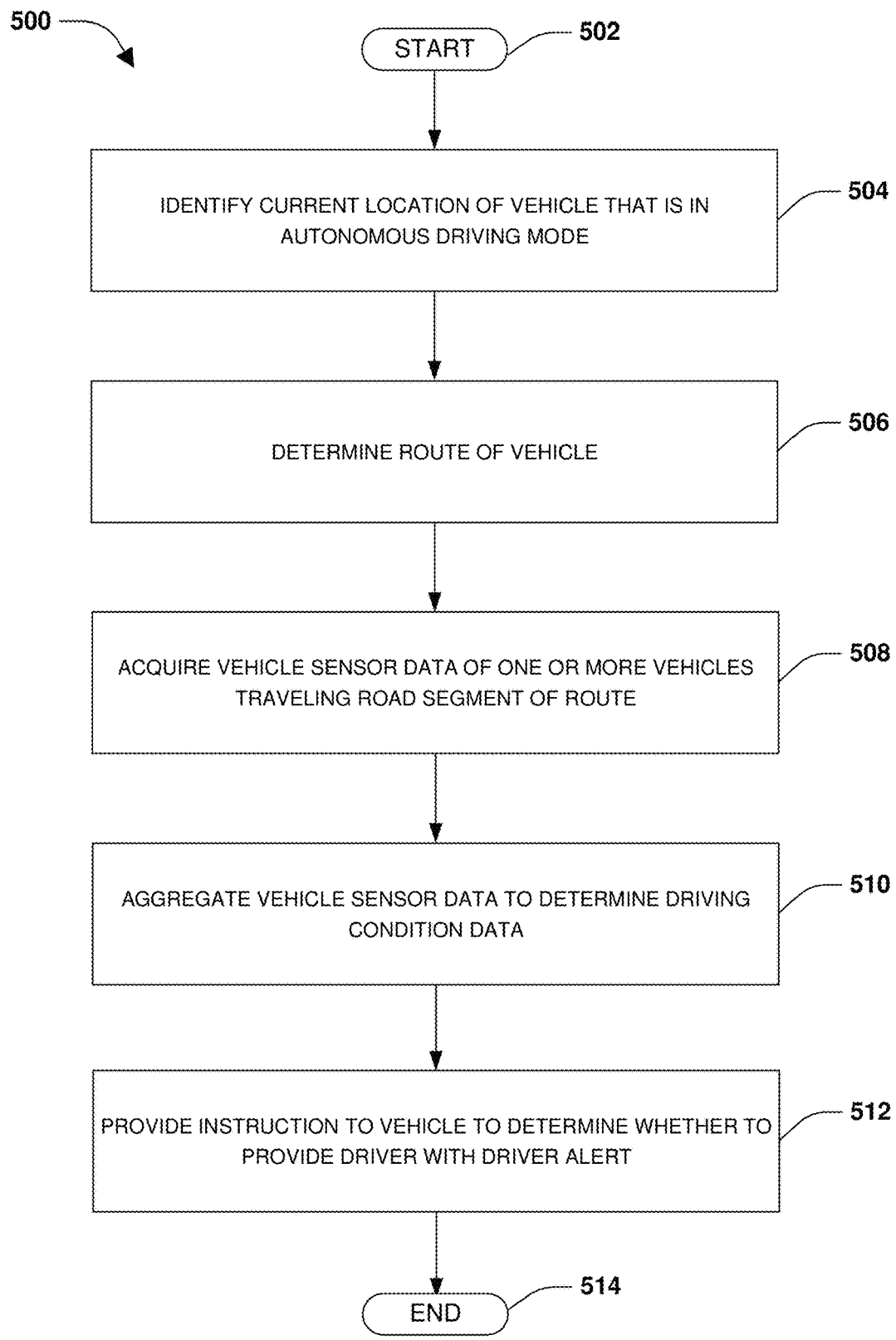
FIG. 5 is a flow diagram illustrating an exemplary method of notifying a driver to assume manual vehicle control.

An embodiment of notifying a driver to assume manual vehicle control is illustrated by an exemplary method 500 of FIG. 5. At 502, the method 500 starts. At 504, a current location of a vehicle that is in an autonomous driving mode may be identified. At 506, a route of the vehicle may be determined. At 508, vehicle sensor data may be acquired from one or more vehicles traveling a road segment of the route. The road segment may not yet be traveled by the vehicle. At 510, the vehicle sensor data may be aggregated to determine driving condition data for the road segment. At 512, an instruction, comprising the driving condition data, may be provided to the vehicle. The instruction may specify that the vehicle is to determine whether to provide a driver of the vehicle with a driver alert to assume manual vehicle control of the vehicle based upon the driving condition data. At 514, the method 500 ends.

Figure 6:
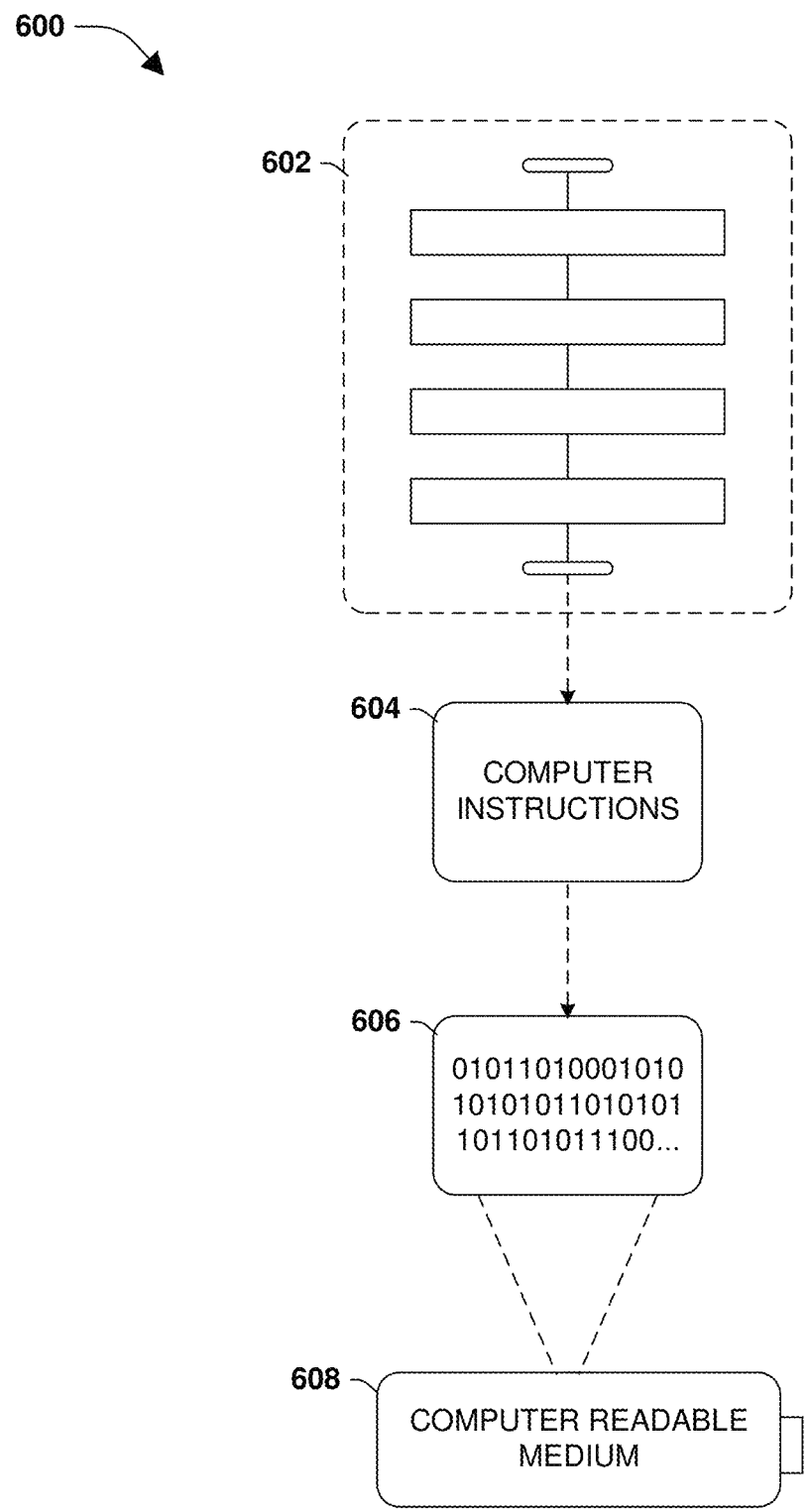
FIG. 6 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 6, wherein the implementation 600 comprises a computer-readable medium 608, such as a CD-R DVD-R, flash drive, a platter of a hard disk drive, etc., on which is encoded computer-readable data 606. This computer-readable data 606, such as binary data comprising at least one of a zero or a one, in turn comprises a set of computer instructions 604 configured to operate according to one or more of the principles set forth herein. In some embodiments, the set of computer instructions 604 are configured to perform a method 602, such as at least some of the exemplary method 100 of FIG. 1 and/or at least some of the exemplary method 500 of FIG. 5, for example. In some embodiments, the set of computer instructions 604 are configured to implement a system, such as at least some of the exemplary system 200 of FIG. 2, at least some of the exemplary system 300 of FIG. 3, and/or at least some of the exemplary system 400 of FIG. 4, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
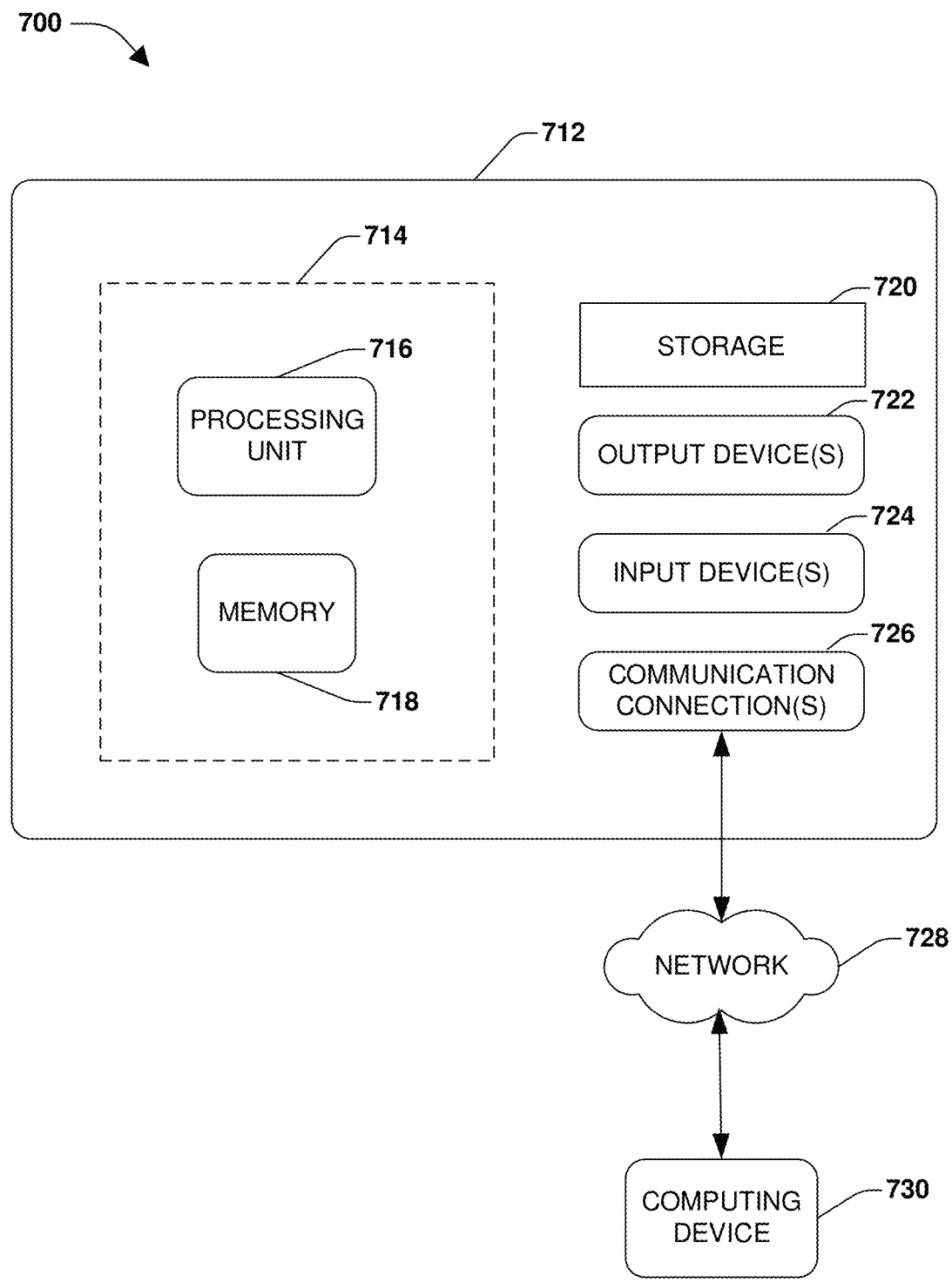
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 700 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Computer storage media does not, however, include propagated signals. Rather, computer storage media excludes propagated signals. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via a network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/ or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for notifying a driver to assume manual vehicle control, comprising:
    evaluating sensor data, acquired from one or more onboard sensors of a vehicle that is in an autonomous driving mode, to determine a driving condition of a road segment that is to be traveled by the vehicle;
    determining a cognitive load of the driver;
    responsive to determining that the driving condition exceeds a complexity threshold, derived from the cognitive load, for autonomous driving decision making functionality, generating a driver alert to assume manual vehicle control;
    selecting a point in time at which to provide the driver alert relative to a point in time at which the road segment is encountered based upon the cognitive load of the driver and the driving condition in relation to the autonomous driving decision making functionality corresponding to computational expense to resolve a driving action to perform before reaching the road segment, an ability to resolve a desirable result, and whether an unknown parameter or unknown constraint that cannot be processed by the autonomous driving decision making functionality is present; and
    providing the driver alert to the driver of the vehicle at the point in time, relative to the point in time at which the road segment is encountered.

2. The method of claim 1, wherein determining the cognitive load comprises determining the cognitive load of the driver by monitoring activity of the driver.

3. The method of claim 1, comprising:
identifying a potential alternate route to avoid the road segment, wherein determining the point in time at which to provide the driver alert comprises determining the point in time based upon a current location of the vehicle and a location of the potential alternate route.

4. The method of claim 1, comprising:
utilizing travel prediction functionality to predict a route of the vehicle; and
identifying the road segment based upon the route and a current location of the vehicle.

5. The method of claim 1, comprising:
receiving driving condition data for the road segment from a remote computing device over a communication connection; and
augmenting the sensor data with the driving condition data.

6. The method of claim 1, comprising:
predicting an amount of time required to determine an appropriate driving action based upon the driving condition; and
setting the complexity threshold based upon the amount of time required to determine the appropriate driving action relative to an amount of time remaining before reaching the road segment.

7. The method of claim 5, the driving condition data corresponding to an aggregation of vehicle sensor data from one or more vehicles while the one or more vehicles traveled the road segment.

8. The method of claim 1, comprising:
receiving, from a remote computing device over a communication connection, a second driving condition for a second road segment that is to be traveled by the vehicle;
responsive to determining that the second driving condition exceeds the complexity threshold for autonomous driving decision making functionality, generating a second driver alert to assume manual vehicle control; and
providing the second driver alert to the driver of the vehicle at a second point in time, relative to the second road segment, based upon the second driving condition.

9. The method of claim 1, the driving condition corresponding to at least one of a road condition, a weather condition, a pedestrian, an accident, an ethical decision, or a driving impediment.

10. The method of claim 1, wherein determining the cognitive load comprises determining the cognitive load of the driver utilizing at least one of a microphone or a camera.

11. The method of claim 1, wherein determining the cognitive load comprises determining the cognitive load based upon conversations between the driver and another person.

12. The method of claim 1, wherein monitoring activity of the driver comprises observing whether the driver is at least one of: eating, sleeping, or engaging a computing device.

13. A system, comprising:
a processor; and
memory that when executed by the processor performs operations for notifying a driver to assume manual vehicle control, the operations comprising:
evaluating sensor data, acquired from one or more on-board sensors of a vehicle that is in an autonomous driving mode, to determine a driving condition of a road segment that is to be traveled by the vehicle;
determining a cognitive load of the driver;
responsive to determining that the driving condition exceeds a complexity threshold, derived from the cognitive load, for autonomous driving decision making functionality, generating a driver alert to assume manual vehicle control;
selecting a point in time at which to provide the driver alert relative to a point in time at which the road segment is encountered based upon the cognitive load of the driver and the driving condition in relation to the autonomous driving decision making functionality corresponding to computational expense to resolve a driving action to perform before reaching the road segment, an ability to resolve a desirable result, and whether an unknown parameter or unknown constraint that cannot be processed by the autonomous driving decision making functionality is present; and
providing the driver alert to the driver of the vehicle at the point in time, relative to the point in time at which the road segment is encountered.

14. The system of claim 13, wherein determining the cognitive load comprises determining the cognitive load of the driver by monitoring activity of the driver.

15. The system of claim 13, the operations comprising:
identifying a potential alternate route to avoid the road segment, wherein determining the point in time at which to provide the driver alert comprises determining the point in time based upon a current location of the vehicle and a location of the potential alternate route.

16. The system of claim 13, the operations comprising:
utilizing travel prediction functionality to predict a route of the vehicle; and
identifying the road segment based upon the route and a current location of the vehicle.

17. The system of claim 13, the operations comprising:
receiving driving condition data for the road segment from a remote computing device over a communication connection; and
augmenting the sensor data with the driving condition data.

18. The system of claim 13, the operations comprising:
predicting an amount of time required to determine an appropriate driving action based upon the driving condition; and
setting the complexity threshold based upon the amount of time required to determine the appropriate driving action relative to an amount of time remaining before reaching the road segment.

19. The system of claim 17, the driving condition data corresponding to an aggregation of vehicle sensor data from one or more vehicles while the one or more vehicles traveled the road segment.

20. A non-transitory machine readable medium having stored thereon processor-executable instructions that when executed cause performance of operations for notifying a driver to assume manual vehicle control, the operations comprising:
evaluating sensor data, acquired from one or more on-board sensors of a vehicle that is in an autonomous driving mode, to determine a driving condition of a road segment that is to be traveled by the vehicle;
determining a cognitive load of the driver;
responsive to determining that the driving condition exceeds a complexity threshold, derived from the cognitive load, for autonomous driving decision making functionality, generating a driver alert to assume manual vehicle control;

selecting a point in time at which to provide the driver alert relative to a point in time at which the road segment is encountered based upon the cognitive load of the driver and the driving condition in relation to the autonomous driving decision making functionality corresponding to computational expense to resolve a driving action to perform before reaching the road segment, an ability to resolve a desirable result, and whether an unknown parameter or unknown constraint that cannot be processed by the autonomous driving decision making functionality is present; and providing the driver alert to the driver of the vehicle at the point in time, relative to the point in time at which the road segment is encountered.

\* \* \* \* \*